United States Patent
Masuda et al.

(10) Patent No.: US 6,757,123 B2
(45) Date of Patent: Jun. 29, 2004

(54) METHOD AND APPARATUS FOR CLEANING A MAGNETO-RESISTIVE HEAD

(75) Inventors: Kenmei Masuda, Yokohama (JP);
Hidekazu Takeda, Hiratsuka (JP);
Shigeru Yamazaki, Yokohama (JP);
Akihisa Obata, Hitachinaka (JP);
Toshio Tsuchiya, Hitachinaka (JP);
Kenkichi Inada, Hitachinaka (JP);
Kuniako Hirayama, Hitachinaka (JP)

(73) Assignee: Exabyte Corporation, Boulder, CO (US)

( * ) Notice: Subject to any disclaimer, the term of this patent is extended or adjusted under 35 U.S.C. 154(b) by 340 days.

(21) Appl. No.: 10/051,894

(22) Filed: Jan. 16, 2002

(65) Prior Publication Data

US 2002/0085302 A1 Jul. 4, 2002

Related U.S. Application Data

(63) Continuation of application No. 09/631,612, filed on Aug. 4, 2000.

(51) Int. Cl.$^7$ .............................................. G11B 15/18
(52) U.S. Cl. ........................ 360/69; 360/122; 360/128
(58) Field of Search ................................. 360/128, 122, 360/69

(56) References Cited

U.S. PATENT DOCUMENTS

| | | |
|---|---|---|
| 5,170,304 A | 12/1992 | Katohno et al. |
| 5,182,691 A | 1/1993 | Mimasu et al. |
| 5,978,185 A | 11/1999 | Abe et al. |

FOREIGN PATENT DOCUMENTS

| | | |
|---|---|---|
| JP | 09022514 | 1/1997 |
| JP | 09054919 | 2/1997 |

*Primary Examiner*—David Hudspeth
*Assistant Examiner*—Mitchell Slavitt

(57) ABSTRACT

According to the invention, techniques for cleaning a rotary magneto-resistive head. Embodiments according to the invention are especially useful in tape drive systems, and the like. Embodiments can provide methods and apparatus for cleaning contaminant from rotary magneto-resistive heads while guarding against damage to the head from excess cleaning, and the like. Specific embodiments can control the rotational speed of a rotary magneto-resistive head in order to facilitate cleaning operations. Embodiments include a cleaning device and a control method, and are suited for use in a magneto-resistive head mounted on a rotary cylinder of a computer tape storage unit, for example, although application of the present invention is not limited to such embodiments.

18 Claims, 12 Drawing Sheets

METHOD AND APPARATUS FOR CLEANING A MAGNETO-RESISTIVE HEAD

This is a continuation of application No. 09/631,612 filed on Aug. 4, 2000.

BACKGROUND OF THE INVENTION

This invention relates generally to techniques for cleaning a magnetic tape reproducing device, and specifically to methods and apparatus for cleaning a rotary magneto-resistive head used in such reproducing devices.

The use of magneto-resistive (MR) head technology in conventional hard disk drive (HDD) units has resulted in increased recording densities. The MR head is beginning to appear in linear tape systems, as well. Application of MR head technology in helical scan tape systems has been suggested. However, in order to achieve sufficient reliability, better techniques for cleaning rotary MR heads can be developed.

As is well known, when foreign matter or dirt adheres to the surface of a rotary magneto-resistive head of a magnetic tape reproducing device, proper reproduction from the magnetic tape becomes difficult to carry out. Particularly, in a linear tape storage unit for a computer, foreign matter present on the surface of a magnetic head can result in system failure or data loss, for example. In helical scan systems, "head clog" can occur during read and write operations because of rubbing condition between head and tape. This phenomenon is attributable to the helical heads protruding from the upper drum in the wrapped tape on file drum. Head clog can cause an unreadable data situation during write-read mode, for example. This can result in failure to achieve normal reproduction of the stored information.

What is needed are improved techniques for cleaning rotary magneto-resistive heads.

SUMMARY OF THE INVENTION

According to the invention, techniques for cleaning a rotary magneto-resistive head are provided. Specific embodiments according to the invention can be especially useful in tape drive systems, and the like. Embodiments can provide methods and apparatus for cleaning contaminant from rotary magneto-resistive heads while guarding against damage to the head from excess cleaning, and the like. Specific embodiments can control the rotational speed of a rotary magneto-resistive head in order to facilitate cleaning operations. Embodiments can control a position as well as a force of contact between a cleaning mechanism and a rotary magneto-resistive head. Embodiments include a cleaning device and a control method, and are suited for use in a magneto-resistive head mounted on a rotary cylinder of a computer tape storage unit, for example, although application of the present invention is not limited to such embodiments.

It is an object of specific embodiments according to the present invention to provide relatively improved approaches to cleaning a rotary magneto-resistive head.

In a representative embodiment according to the present invention, an apparatus for cleaning a rotary magneto-resistive head is provided. The apparatus can include a cleaning roller supported by an actuator arm, in order to position the cleaning roller in and out of contact with at least the rotary magneto-resistive head. In some configurations, the cleaning roller can also contact a stationary portion of a rotating cylinder holding the rotary magneto-resistive head, for example. The apparatus can also comprise a cam coupled to the actuator arm in order to provide a linear motion for the cleaning roller. A mode motor can be coupled to the cam in order to provide motion. An error detector can be electrically coupled with the rotary magneto-resistive head to sense an error rate, for example. A read amplifier, electrically coupled with the rotary magneto-resistive head, can sense a presence of thermal noise in an output of the head. A control device can be coupled to the error detector, the read amplifier and the mode motor. The control device positions the cleaning roller in contact with the rotary magneto-resistive head by action of the actuator arm, the cam and under power of the mode motor, for example. The cleaning roller is positioned responsive to the error detector determining an error rate in excess of a threshold, and the like. The cleaning roller is positioned out of contact with the rotary magneto-resistive head responsive to the read amplifier determining a presence of thermal noise in excess of a threshold.

In another representative embodiment according to the present invention, an apparatus can comprise a motor driver speed control that is coupled to the control device, in order to control a rotational speed of the rotary magneto-resistive head. The control device can reduce the rotational speed of the rotary magneto-resistive head responsive to the read amplifier determining a presence of thermal noise in excess of a threshold, for example.

In a further representative embodiment according to the present invention, a force of contact between a cleaning roller and a rotary magneto-resistive head can be controlled by monitoring a current drawn by a drive motor turning a drum onto which one or more rotary magneto-resistive heads are mounted for the purpose of sensing an overload condition. If such a condition is sensed, a contact force of the cleaning roller against the rotary magneto-resistive head can be reduced by a control mechanism. In some specific embodiments, the ambient temperature and or the ambient humidity are accounted for when determining whether an overload condition exists in the drive motor.

In a yet further representative embodiment according to the present invention, an apparatus can comprise a motor current detector that is electrically coupled to a drive motor providing rotational motion to the magneto-resistive head, as well as to the control device, in order to provide an indication of a load placed on the drive motor by the cleaning roller contacting at least the rotary magneto-resistive head. The control device positions the cleaning roller out of contact with the rotary magneto-resistive head responsive to an overload condition detected by comparing the indication of a load provided by the motor current detector with a stored threshold that provides an indication of a current load of the drive motor with the cleaning roller not in contact with the magneto-resistive head.

In a still further representative embodiment according to the present invention, a method for cleaning a rotary magneto-resistive head can comprise a variety of steps. A step of selecting a verify/read mode of operation for the rotary magneto-resistive head can be part of the method. Further, the method can include detecting an error rate in excess of a threshold. Steps of halting travel of a magnetic tape adjacent to the rotary magneto-resistive head and positioning a cleaning roller in contact with at least the rotary magneto-resistive head can also be part of the method. The method also includes positioning the cleaning roller out of contact with the rotary magneto-resistive head responsive to an occurrence of either determining a presence of thermal noise in excess of a threshold, or a determination that the error rate has fallen below the threshold. In specific embodiments, the method can also include reducing a rotational speed of the rotary magneto-resistive head responsive to a determination of a presence of thermal noise in excess of a threshold.

In a still yet further representative embodiment according to the present invention, the method can also include a step of storing a threshold indicating a current load of the drive motor with the cleaning roller not in contact with the at least the magneto-resistive head. A threshold can be determined based upon an indication of current load, for example. Some specific embodiments can base the threshold on an ambient temperature and/or an ambient humidity, as well. A step of detecting a load placed on a drive motor by the cleaning roller contacting at least the rotary magneto-resistive head by sensing a current consumed by the drive motor is also part of the method. Further, the method can include the steps of comparing the indication of a load provided by the motor current detector with the threshold current load stored previously to detect an overload condition and controlling a force of contact between the cleaning roller and the rotary magneto-resistive head to eliminate the overload condition. Alternatively, some embodiments can position the cleaning roller out of contact with the rotary magneto-resistive head responsive to any overload condition detected.

In a still further representative embodiment according to the present invention, an apparatus for cleaning a rotary magneto-resistive head is provided. The apparatus comprises a cleaning device for a rotary magneto-resistive head. The cleaning device comprises a cleaning roller, positioned to contact the rotary magneto-resistive head and a conductive element positioned to contact the cleaning roller when the cleaning roller is not in contact with the magneto-resistive head.

In a still yet further representative embodiment according to the present invention, an apparatus for cleaning a rotary magneto-resistive head is provided. The apparatus comprises a cleaning device for a rotary magneto-resistive head. The cleaning device comprises a cleaning roller, positioned to contact the rotary magneto-resistive head. The cleaning roller has a conductive element positioned to contact the cleaning roller and routed through a member supporting the cleaning roller to a carbon brush that makes contact with a conductive leaf spring contact, which is connected to ground.

Numerous benefits are achieved by way of the present invention over conventional techniques. The present invention can provide methods and apparatus for cleaning contaminant from rotary magneto-resistive heads while guarding against damage to the head from excess cleaning, and the like. Specific embodiments can sense drive motor loading in order to insure that excess contact pressure is not placed on the rotary magneto-resistive head.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

Figure 1A:
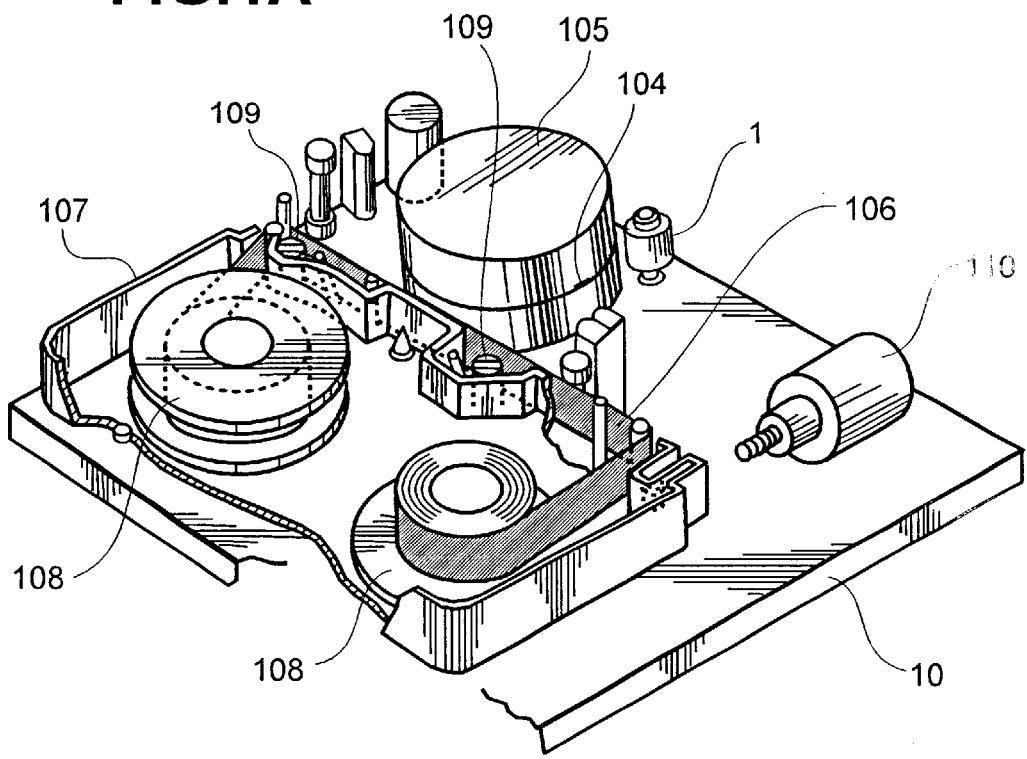
FIG. 1A illustrates a representative tape drive and tape cartridge in a specific embodiment according to the present invention.

The present invention provides techniques for cleaning a rotary magneto-resistive head. Embodiments according to the invention can be especially useful in linear tape drive systems, and the like. Embodiments can provide methods and apparatus for cleaning contaminant from rotary magneto-resistive heads while guarding against damage to the head from excess cleaning, and the like. Specific embodiments can control the rotational speed of a rotary magneto-resistive head in order to facilitate cleaning operations. Embodiments include a cleaning device and a control method, and are suited for use in a magneto-resistive head mounted on a rotary cylinder of a computer tape storage unit, for example, although application of the present invention is not limited to such embodiments.

In helical scan systems, "head clog" can occur during read and write operations because of rubbing condition between head and tape. This phenomenon is attributable to the helical heads protruding from the upper drum in the wrapped tape on file drum. Head clog can cause an unreadable data situation during write-read mode, for example. This can result in failure to achieve normal reproduction of the stored information.

Conventional approaches to cleaning of recording heads typically concern cleaning operations performed when a tape is first loaded, or prior to unloading. Certain examples include U.S. Pat. No. 5,170,304 and Japanese Patent Application Hei 5-109027. While important contributions to the art in their own right, such conventional approaches do not provide the techniques according to the present invention for cleaning of magneto-resistive rotary heads.

Magneto-resistive head technology provides enhanced sensitivity for reproducing information recorded on non volatile storage media. Such sensitivity can give rise to certain issues when magneto-resistive heads are employed in linear tape devices. One issue integral to use of magneto-resistive heads is that of soft contact. Rubbing between a cleaning apparatus and a magneto-resistive head can cause destruction of the head. Cleaning mechanisms in specific embodiments according to the present invention maintain a soft contact between a cleaning device and a rotary magneto-resistive head. In specific embodiments according to the present invention, a load current of a drum motor can be monitored when the roller contacts the rotating drum carrying the magneto-resistive head. This information can be used to control the contact force of the cleaning roller to the drum.

Another issue arising from the use of magneto-resistive head technology is that of thermal asperity noise. Thermal asperity noise occurs from hard rubbing between head and tape, or cleaning material. In specific embodiments according to the present invention, if thermal asperity noise is detected during head cleaning operations, the cleaning action is immediately stopped, or alternatively, the rotational speed of the rotary head can be slowed to eliminate the thermal asperity noise.

Figure 1B:
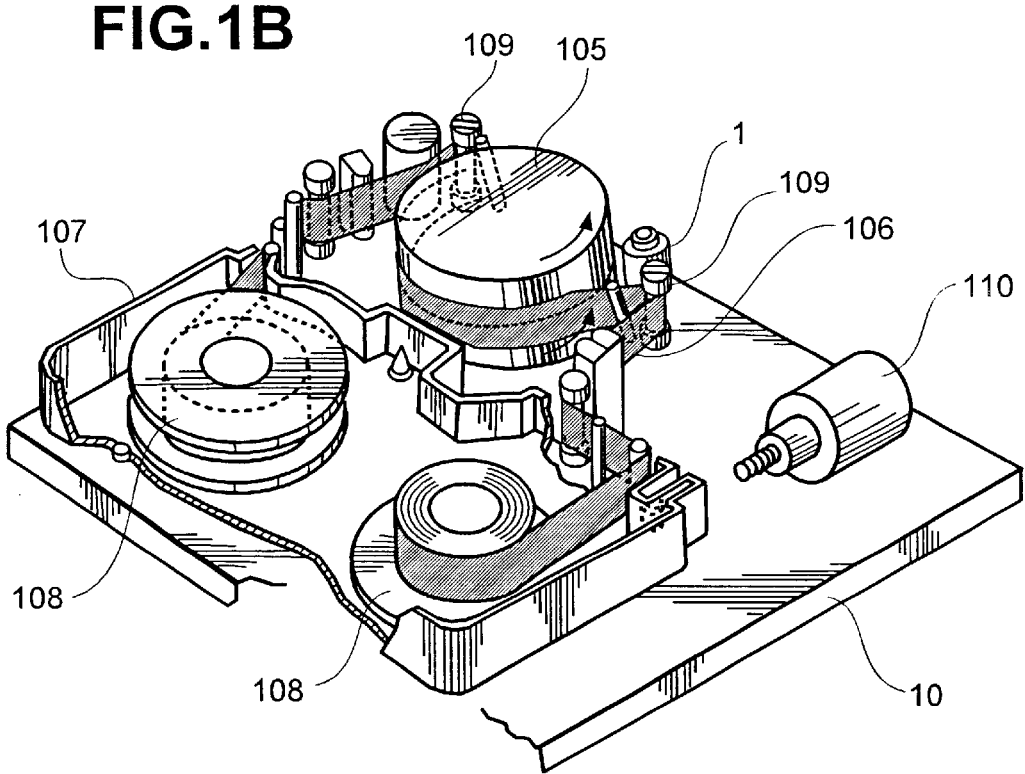
FIG. 1B illustrates a representative operation of a tape drive and tape cartridge in a specific embodiment according to the present invention.

FIG. 1A illustrates a representative tape drive and tape cartridge in a specific embodiment according to the present invention. Tape cartridge 107 can contain an 8 mm format tape, for example, and may have a storage capacity of 100 gigabytes or more. Tape cartridge 101 can house a tape having a metal layer. More specifically, as shown in FIG. 1A, the tape 106 is wound on reels 108, and is housed in a cartridge 107. Tape drive 10 can access data from tape cartridge 101 at data rates of approximately 18–20 Megabytes per second or more, for example. When a cartridge is inserted into tape drive 10, the tape drive pulls a tape out of the cartridge at the time of recording and reproduction. In tape drive 10, when information is to be reproduced from the magnetic tape 106, the tape 106 is pulled out of the cartridge 107 by tape pull-out members 109 and 109, and is brought into contact with the outer periphery of a rotary cylinder 105, as shown in FIG. 1B. Then, when the cylinder 105 is rotated, the tape 106 is driven for movement, and magnetic recording and reproduction are carried out in a well known manner by a magneto-resistive head 104 mounted on the cylinder 105.

Figure 2:
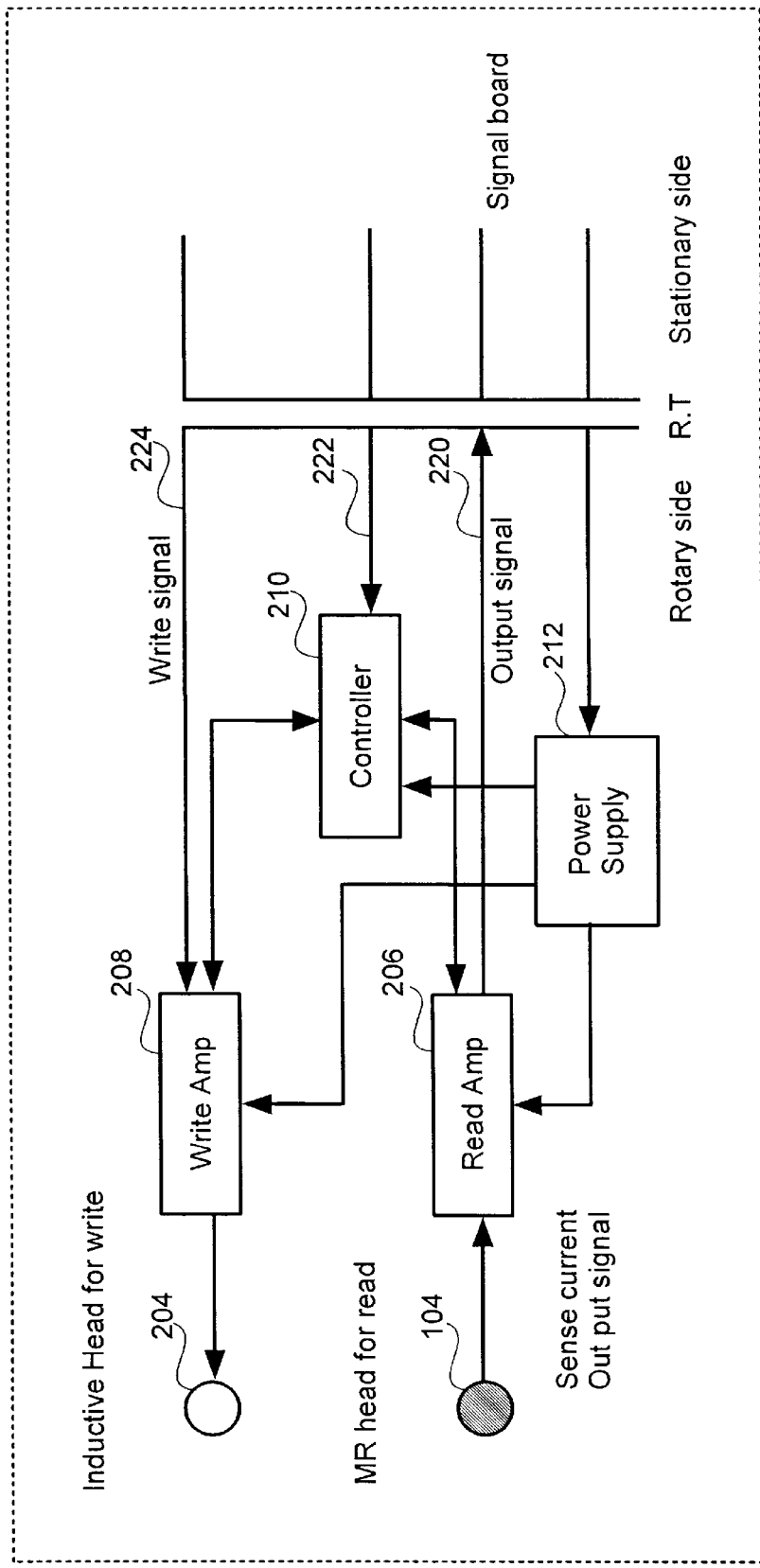
FIG. 2 illustrates a block diagram of a representative tape in a specific embodiment according to the present invention.

FIG. 2 illustrates a block diagram of a representative tape in a specific embodiment according to the present invention. FIG. 2 illustrates an example tape drive having a magneto-resistive read head 104 and an inductive write head 204. The magneto-resistive read head 104 is electrically connected to a read amplifier 206 that amplifies output signals provided by the magneto-resistive read head in order to produce an output signal 220. Inductive write head 204 is electrically connected to a write amplifier 208 that amplifies an input signal 224 to be written to the tape. A controller 210 is interconnected with the read head 104 and the write head 204 in order to coordinate operation of both heads. Controller 210 provides selection of read, write or verify/read operation for the tape drive unit 10 responsive to a control signal 222. A power supply 212 provides power to read amplifier 206, write amplifier 208 and controller 210.

Figure 3:
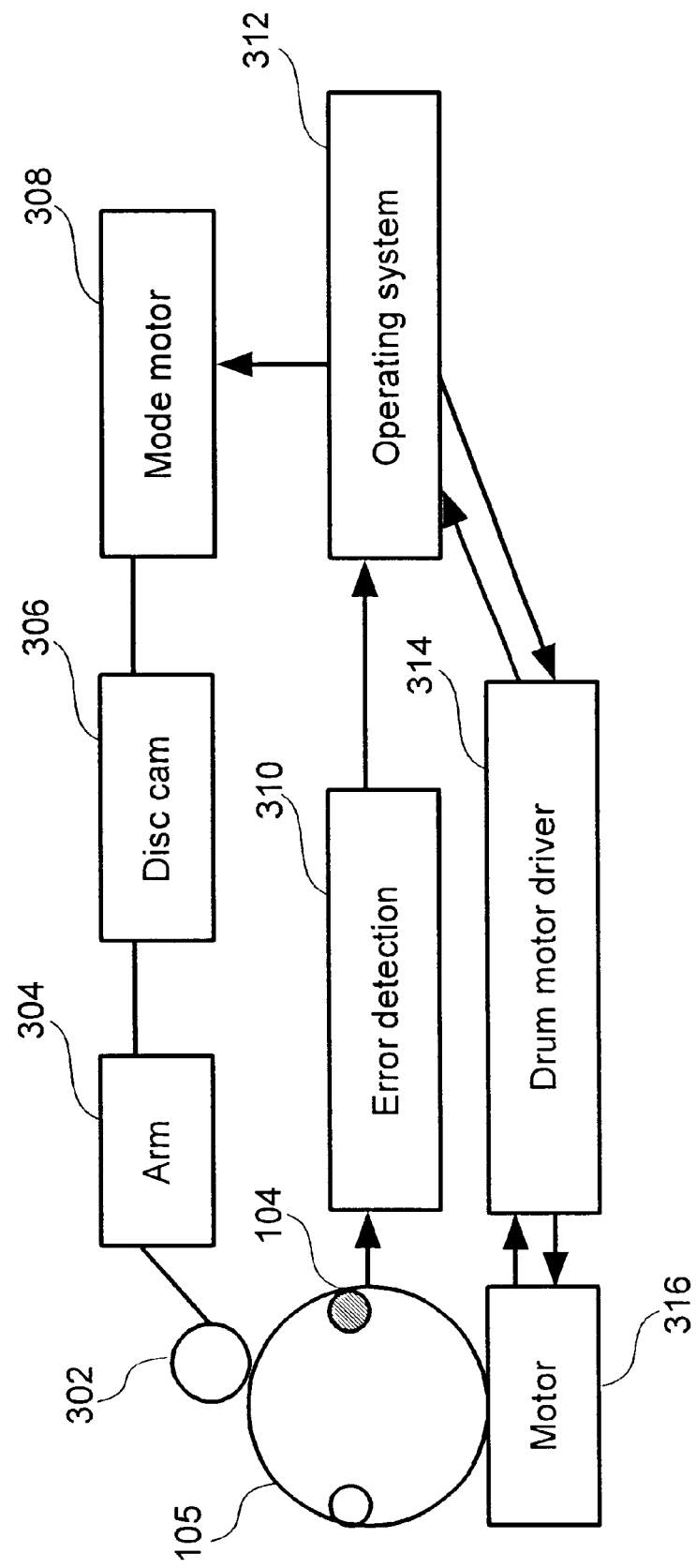
FIG. 3 illustrates a representative rotary magneto-resistive head cleaning mechanism and control system in a specific embodiment according to the present invention.

FIG. 3 illustrates a representative rotary magneto-resistive head cleaning mechanism and control system in a specific embodiment according to the present invention. FIG. 3 illustrates a cleaning roller 302, which can be positioned against a cylinder 105 having a rotary magneto-resistive head 104, for example, by an actuator arm 304. The actuator arm 304 provides support for the cleaning roller 302 and enables positioning of the cleaning roller in and out of contact with at least the rotary magneto-resistive head 104. A cam 306 is coupled to the actuator arm to provide a linear motion for positioning the cleaning roller. The cam 306 is driven by a mode motor 308, which is coupled to the cam to provide motion. An error detection circuit 310 senses an error rate for data written to the tape by the magneto-resistive head 104 in order to provide information about error rate to a control device having an operating system 312. Error detector 310 can comprise a read amplifier that is electrically coupled with the magneto-resistive head 104 in order to sense a presence of thermal noise in an output of the magneto-resistive head 104. The control device and associated operating system 312 can position the cleaning roller in contact with the rotary magneto-resistive head by action of the actuator arm 304, the cam 306 and under power of the mode motor 308, responsive to the error detection circuit determining an error rate that the operating system 312 determines is in excess of a threshold, for example. Further, the cleaning roller 302 can be positioned out of contact with the cylinder 105 having the rotary magneto-resistive head 104 responsive to the read amplifier determining a presence of thermal noise in excess of a threshold, for example.

A drum motor driver 314 enables operating system 312 to control the starting stopping and speed of a drive motor 316 that drives cylinder 105.

Figure 4A:
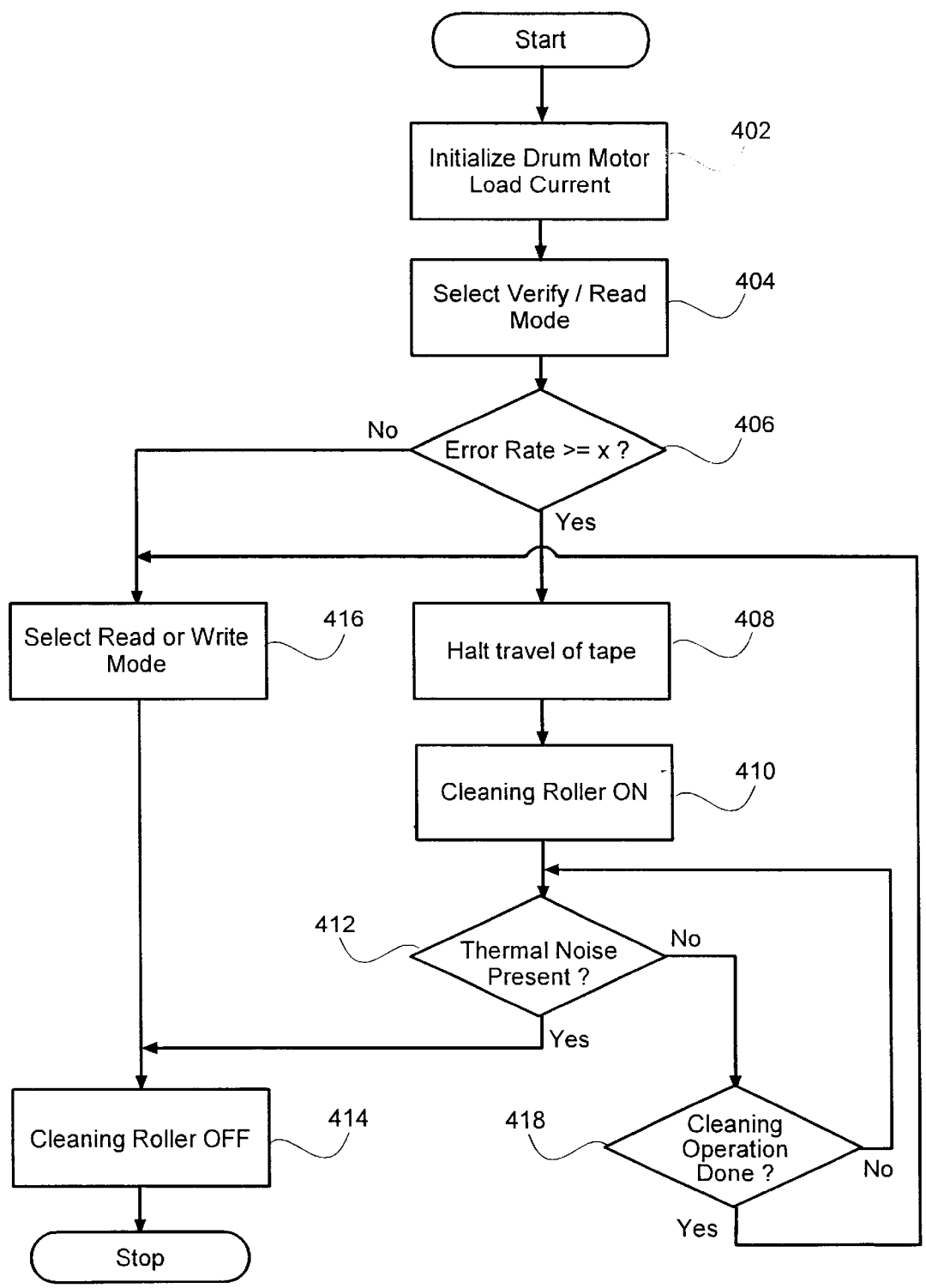
FIG. 4A illustrates a flowchart of representative operation of a specific embodiment according to the present invention.

FIG. 4A illustrates a flowchart of representative operation of a specific embodiment according to the present invention. A method for cleaning a rotary magneto-resistive head 104, as illustrated by FIG. 4A includes a step 402, in which a load current to the drum motor 316 is initialized. Next, in a step 404, a verify/read mode is selected by operation of controller 210. Accordingly, a read operation is subsequently performed on data written by the head in order to verify operation of the head, as well as integrity of the data. Then, as illustrated by a step 406, an error rate during verify/read operations is detected. If an error rate in excess of a threshold is detected, then at a step 408, travel of the magnetic tape adjacent to the rotary magneto-resistive head is halted, and in a step 410, the cleaning roller 302 is positioned in contact with at least the rotary magneto-resistive head in order to clean the head. If a thermal noise is detected in a step 412, then processing proceeds to a step 414, in which the cleaning roller 302 is positioned out of contact with the cylinder 105 and rotary magneto-resistive head 104 responsive to the occurrence of thermal noise in excess of a threshold. Otherwise, if thermal noise is not detected, processing continues with step 418 to determine if the cleaning operation is complete. In a specific embodiment, cleaning operations take place for a constant period of time (T0). If the cleaning operation is determined to be complete, then processing continues with step 416 to resume read or write mode, and then to a step 414, in which the cleaning roller 302 is removed from contact with the cylinder 105 and rotary magneto-resistive head 104. Otherwise, processing proceeds with step 412 to continue to monitor the cleaning operation for the presence of thermal noise.

Figure 4B:
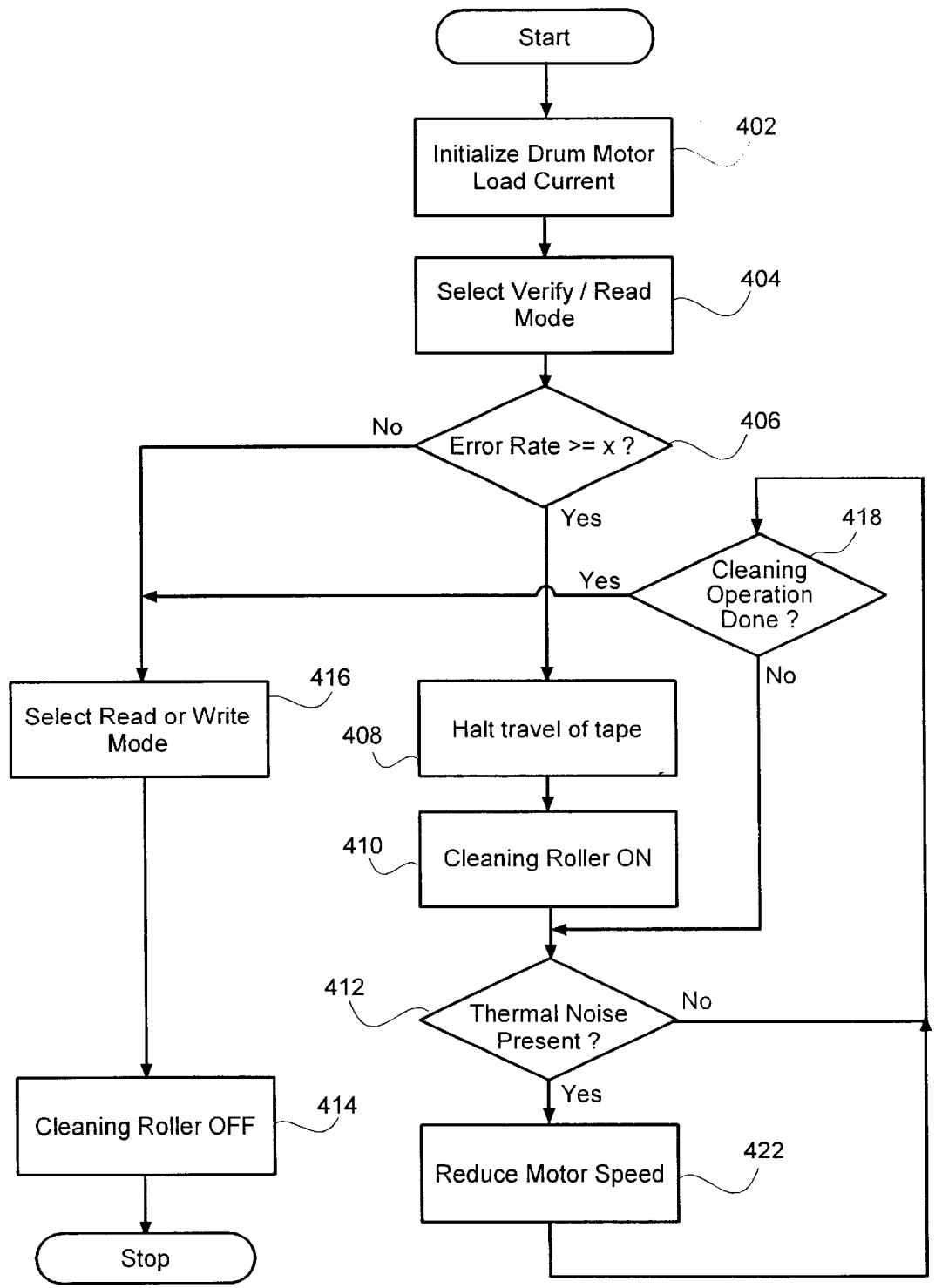
FIG. 4B illustrates a flowchart of representative operation of another specific embodiment according to the present invention.

FIG. 4B illustrates a flowchart of representative operation of another specific embodiment according to the present invention. Steps illustrated in FIG. 4B that are common to the embodiment illustrated in FIG. 4A were discussed herein above with respect to FIG. 4A. If in step 412, thermal noise is detected when the cleaning roller is in contact with the rotary magneto-resistive head, then processing continues with a step 422, in which the rotational speed of the cylinder 105, and hence the rotary magneto-resistive head 104, is reduced in order to reduce the cause of the thermal noise. Then, processing continues with steps 418–412, which make another check for thermal noise in step 412. If reducing motor rotational speed has reduced the noise below threshold, then cleaning proceeds until, in step 418, it is determined that the cleaning operation has completed, in which case processing continues with step 416 to resume read or write mode, and then to a step 414, in which the cleaning roller 302 is removed from contact with the cylinder 105 and rotary magneto-resistive head 104.

Figure 4C:
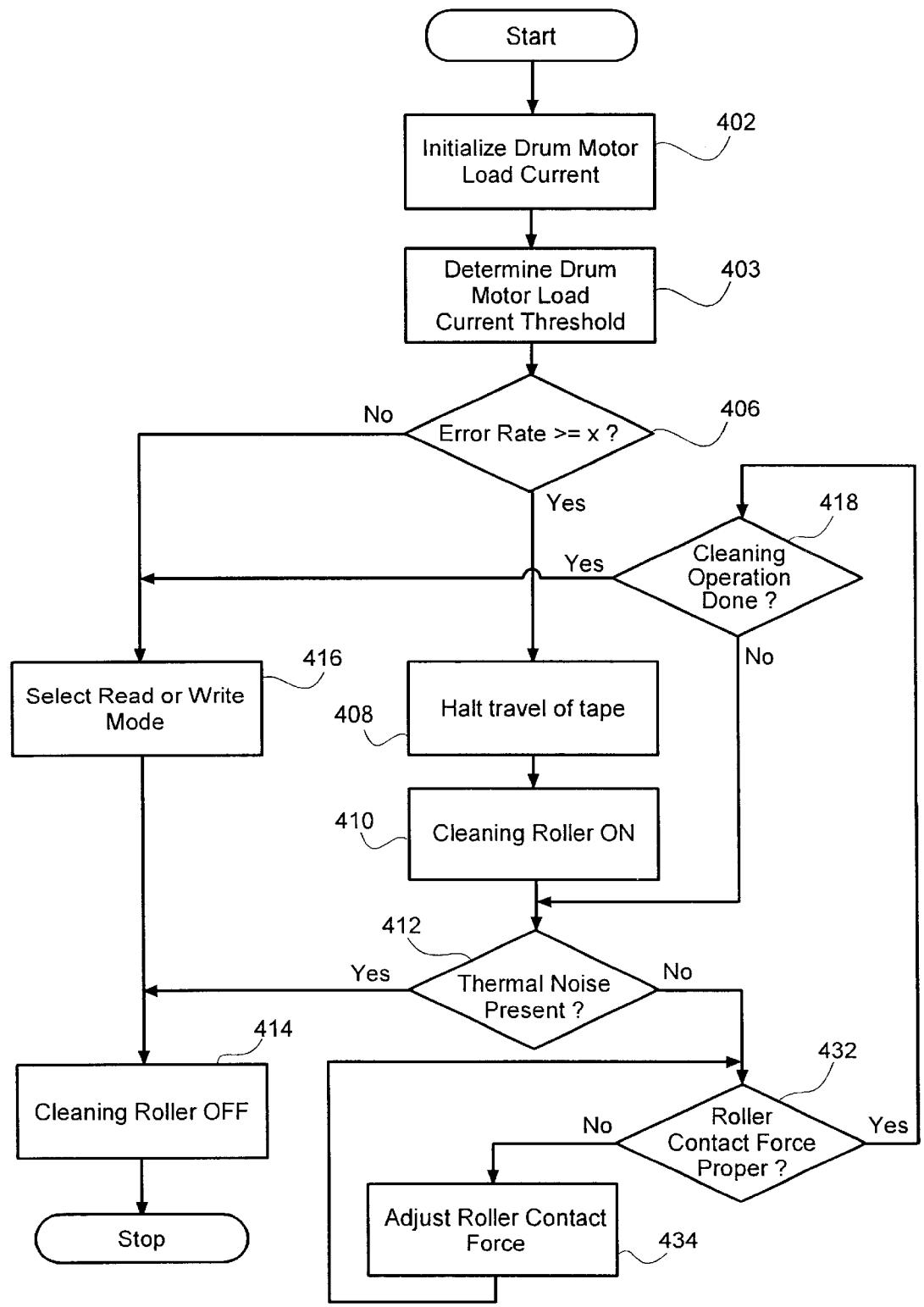
FIG. 4C illustrates a flowchart of representative operation of a yet further specific embodiment according to the present invention.

FIG. 4C illustrates a flowchart of representative operation of another specific embodiment according to the present invention. Steps illustrated in FIG. 4C that are common to the embodiment illustrated in FIG. 4A were discussed herein above with respect to FIG. 4A. FIG. 4C illustrates a step 403, in which indications of a current load of the drive motor 316 in various configurations are determined and stored. For example, a current indication is detected in a configuration in which the cleaning roller 302 is not in contact with the cylinder 105 and no tape is loaded. Additionally, a current indication is detected in a configuration in which the cleaning roller 302 is in contact with cylinder 105, but no tape is loaded. Yet further, a current indication is detected in a configuration in which the cleaning roller 302 is not in contact with cylinder 105, but a tape is loaded. Each of these current indications can be stored. The detecting of such current indications in a particular embodiment will be described below in further detail with reference to FIG. 4D.

Subsequently, during cleaning operation, in a step 432, a load placed or the drive motor 316 by the cleaning roller 302 contacting the cylinder 105 and the presence of the tape is detected by sensing a current consumed by the drive motor 316. The indication of a load provided by the motor current detected is compared with a reference current loads determined previously in step 403 in order to detect an improper amount of contact force by the cleaning roller 302 against the cylinder 105 and magneto-resistive head 104. If an improper amount of force is detected, then in a step 434, the position of the cleaning roller 302, and hence the force of contact of the cleaning roller against the cylinder 105, is controlled to remedy the loading on the drive motor. The comparing of such current indications in a particular embodiment will be described below in further detail with reference to FIG. 4E. Processing continues with step 432 to provide control of the force of the cleaning roller 302 contacting the cylinder 105 and the rotary magneto-resistive head 104 until the cleaning operation completes, as detected by step 418, or thermal noise appears, as detected in step 412.

Figure 4D:
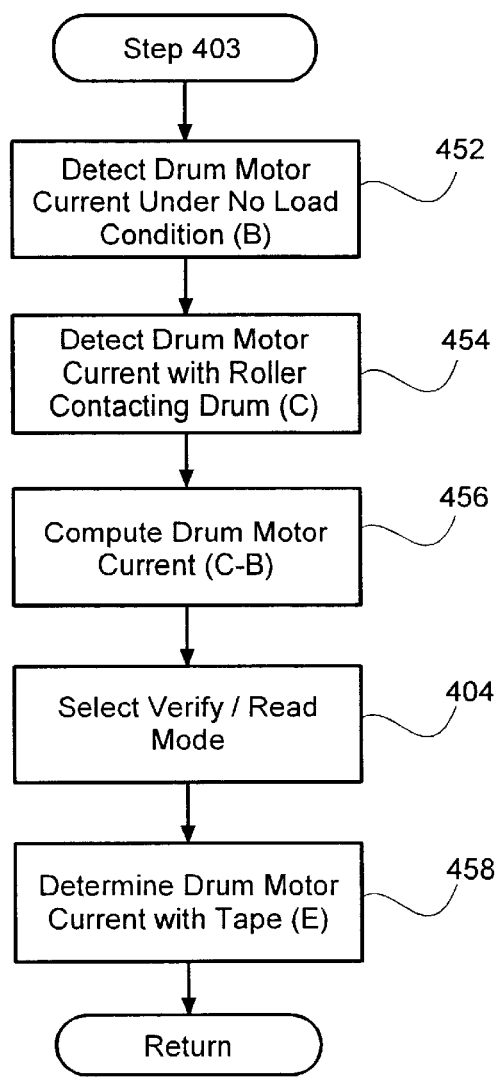
FIG. 4D illustrates a flowchart of representative operation of a yet further specific embodiment according to the present invention.
Figure 6:
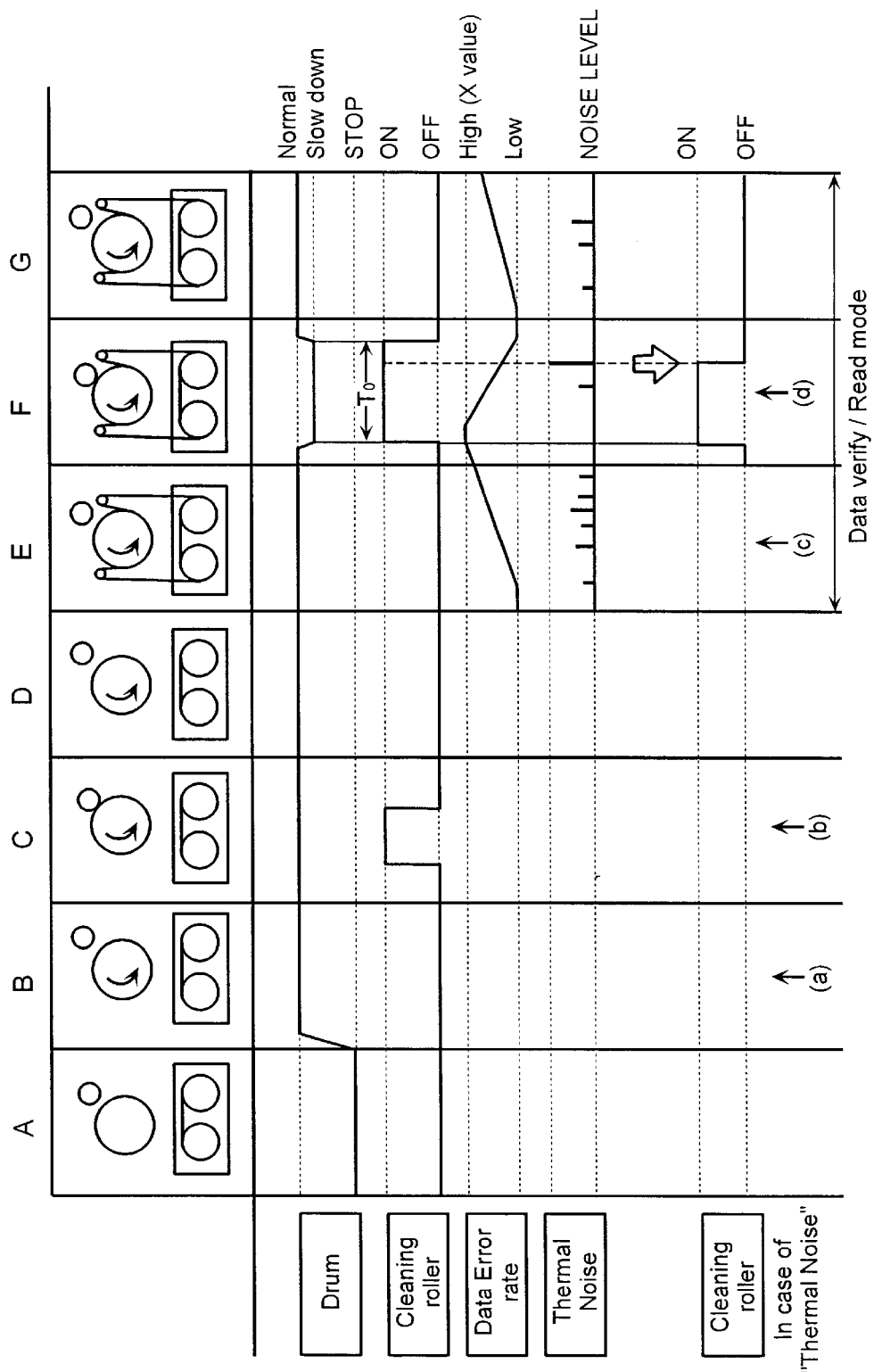
FIG. 6 illustrates a diagram of operation of a representative cleaning device in a specific embodiment according to the present invention.

FIG. 4D illustrates a flowchart of representative operation of another specific embodiment according to the present invention. FIG. 4D illustrates a plurality of steps comprising step 403 of FIG. 4C in a specific embodiment according to the present invention. The steps illustrated by FIG. 4D correspond to operations illustrated in FIG. 6. Specifically, FIG. 4D illustrates a step 452, in which a drum load current is detected in a condition in which no tape is loaded and the cleaning roller does not contact the drum. This state is comparable to that of operation B, as illustrated in FIG. 6. Then, in a step 454, a drum load current is detected in a condition in which the drum is in contact with the cleaning roller, but no tape is loaded. This state is comparable to that of operation C, as illustrated in FIG. 6. In a step 456, a current load is computed by subtracting the current measured in step 452 from the current measured in step 454, (C)-(B), to determine a load current due only to contact with a cleaning roller. This value can be stored by operating system 312, so that the system can make comparisons with a known state of an initialized condition before data verify/read mode. Then, in a step 404, verify/read mode is selected. Then, in a step 458, a drum load current is detected in a condition in which the drum is not in contact with the cleaning roller, but a tape is loaded. This state is comparable to that of operation E, as illustrated in FIG. 6. These reference values can be stored for later comparison with a measured drum motor current load in order to detect adverse drive motor conditions in step 432 of FIG. 4C.

Figure 4E:
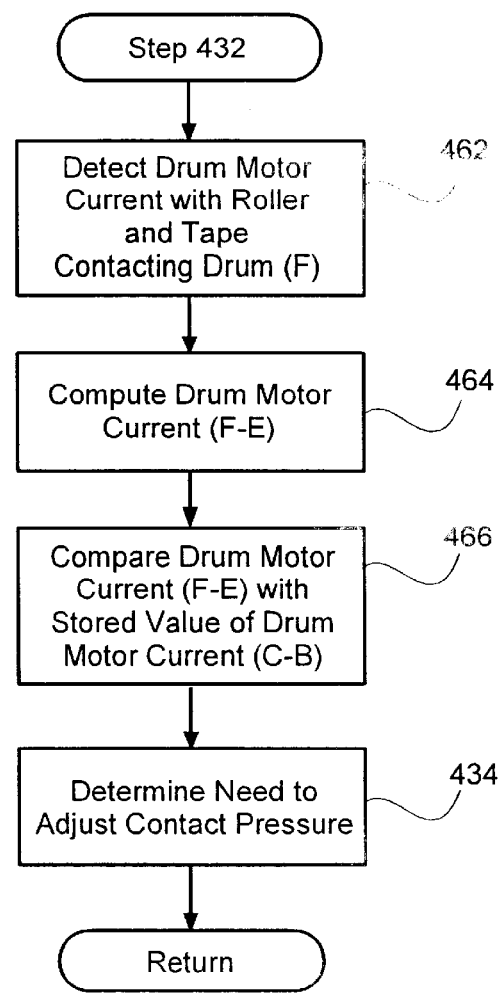
FIG. 4E illustrates a flowchart of representative operation of a yet further specific embodiment according to the present invention.

FIG. 4E illustrates a flowchart of representative operation of another specific embodiment according to the present invention. FIG. 4E illustrates a plurality of steps comprising step 432 of FIG. 4C in a specific embodiment according to the present invention. Some steps illustrated by FIG. 4E correspond to operations illustrated in FIG. 6. Specifically, FIG. 4E illustrates a step 462, in which a drum load current is detected in a condition in which both tape and cleaning roller are in contact with the drum. This state is comparable to that of operation F, as illustrated in FIG. 6. Then, in a step 464, operating system 312 can determine the load current attributable only to the cleaning roller by subtracting the load current measured in step 458 of FIG. 4D from the load current measured in step 462, according to the relation (F)-(E). Then, in a step 466, operating system 312 can compare the value of (F)-(E), computed in step 464, with that of (C)-(B), computed in step 456. Differences in these values can indicate a need for adjusting contact pressure between cleaning roller 302 and cylinder 105. For example, if cleaning roller 302 wears after long time, (F)-(E) current will have a lower value compared with (C)-(B) current. Accordingly, operating system 312 can increase contact pressure in step 434 of FIG. 4C, until the values for (F)-(E) and (C)-(B) are brought into agreement. Alternatively, if the load current (F)-(E) is significantly larger than (C)-(B), a drum motor overload condition may be occurring, due to excess contact force, for example. Accordingly, operating system 312 can decrease contact pressure in step 434 of FIG. 4C, until the values for (F)-(E) and (C)-(B) are brought into agreement. Specific embodiments can achieve a relatively high degree of reliability in operation of cleaning the magneto-resistive head.

As used herein, a general definition of "overload condition" is a condition in which the force of the cleaning roller in contact with the rotary magneto-resistive head excesses a normal value. If the force is in excess of the normal value, then thermal noise in the MR head will increase markedly, which may lead to damage of the MR head. As used in the foregoing description of the specific embodiments, according to the present invention, the term "overload condition" can be defined as a condition wherein the load current (F) is larger than a normal current. The normal current corresponds to a normal force, as described above. The normal current may be determined by a plurality of techniques. Further, an overload condition can be defined by the load current (F)-(E) being significantly larger than that of (C)-(B) as described in the foregoing specific embodiments. Such overload conditions can bring about the possibility of MR head damage. Accordingly, the cleaning roller can eliminate some debris on MR head surface, but higher contact force can lead to head surface damage from abrasive rubbing between tape and the MR head with debris. Since predicting an exact maximum load current which will not damage the MR head for various conditions, environmental, contamination, tape tension and the like can be impractical, presently preferred embodiments can employ techniques of assuring MR head reliability by detecting the load current by comparison to the reference (C)-(B) value.

Figure 5A:
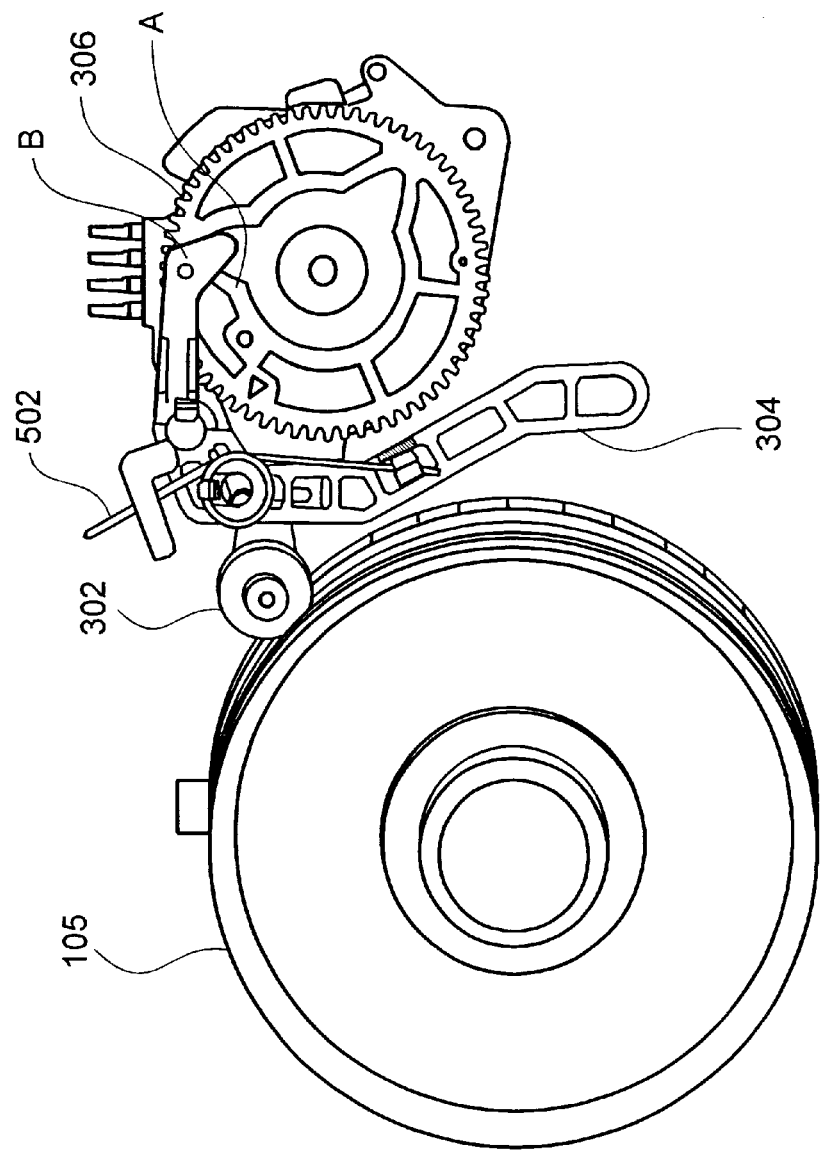
FIG. 5A illustrates a representative cleaning device in a specific embodiment according to the present invention.

FIG. 5A illustrates a representative cleaning device positioning mechanism in a specific embodiment according to the present invention. FIG. 5A illustrates cylinder 105, on which may be disposed a rotary magneto-resistive head 104. Cylinder 105 is in contact with cleaning roller 302. Cleaning roller 302 is positioned by arm 304. Arm 304 is actuated by cam gear 306. Cam gear 306 can operate cleaning roller 302 because an end of the arm(b) is guided by the groove(a). By reason of this, the cleaning roller 302 can swing be made to move in an arc path. A torsion spring 502 causes the cleaning roller 302 to be rotated in CCW direction (roller ON condition). Contact force of cleaning roller 302 can be controlled by cam gear 306 rotation. Specific embodiments can determine a force between cleaning roller 302 and cylinder 105 by choosing best location of groove(a). The cam gear 306 is operated by a mode motor 308 (not shown in FIG. 5A).

Figure 5B:
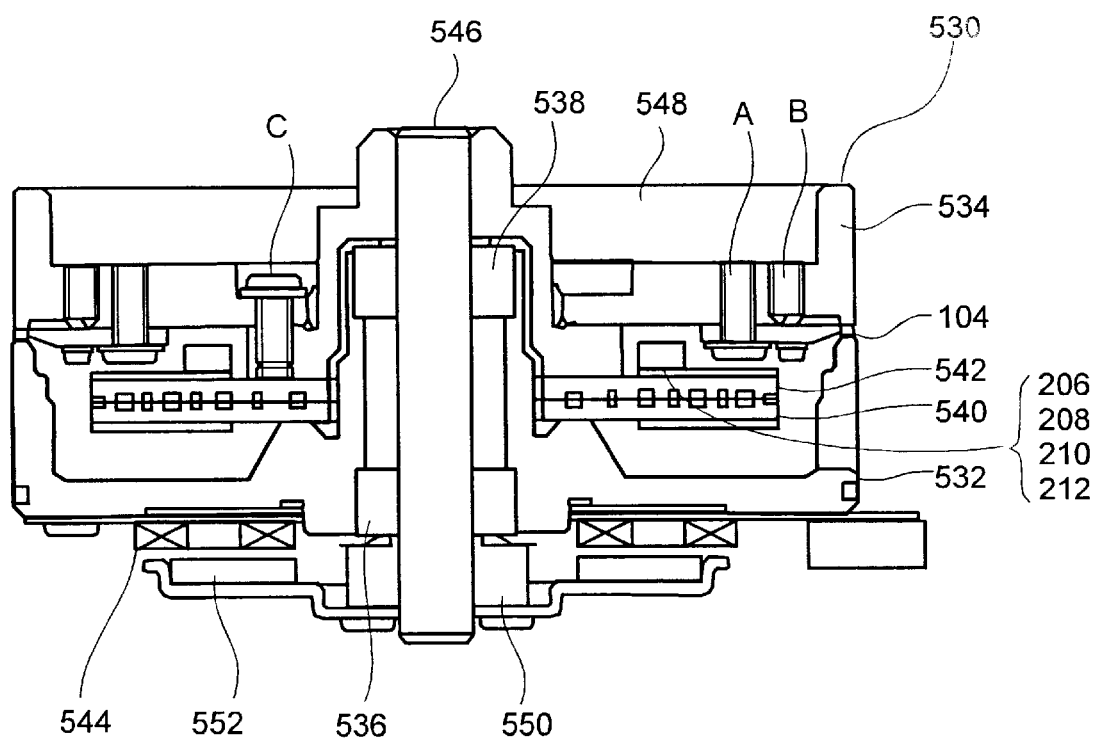
FIG. 5B illustrates a representative rotating drum in a specific embodiment according to the present invention.

FIG. 5B illustrates a profile view of a rotating drum in a specific embodiment according to the present invention. FIG. 5B illustrates a cylinder 530, having a non-rotating cylinder 532 positioned vertically beneath a rotating cylinder 534. The non-rotating cylinder 532 comprises two ball bearings 536 and 538, a stator 540 that matches a corresponding rotor 542 on rotating cylinder 534, and a motor coil 544 located on the outside of non-rotating cylinder 532. A rotary shaft 546 is disposed within and supported by ball bearings 536 and 538, which provide rotational freedom to rotary shaft 546. A rotary disk 548 is fixedly attached to rotary shaft 546. This rotary disk 548 comprises rotating cylinder 534 having a magneto-resistive head 104, rotor 542, which, along with stator 540, comprises a rotary signal transformer. Rotating cylinder 534 is fixedly attached to rotating disk 548 by a screw C, for example (only one screw is shown). Some head bases with heads, including magneto-resistive head 104 and inductive write head 204, are fixedly attached to rotating cylinder 534 by a screw A. Adjustment of head height is provided by a screw B for keeping high-precision track pitch. A connecting signal line is not shown in FIG. 5B. A circuit board comprising read amplifier 206, write amplifier 208, controller 210, and power supply 212, is installed in the inner side of the rotating cylinder 534. To avoid fluctuation of rotating cylinder, a pre-load part 550 is inserted to add pressure to ball bearings 536 and 538. A plurality of motor magnets 552 rotate with this pre-load part 550. The cleaning roller 302 is positioned by the cleaning device positioning mechanism of FIG. 5A in order to make contact with both the rotating cylinder 534 and the non-rotating cylinder 532.

Figure 5C:
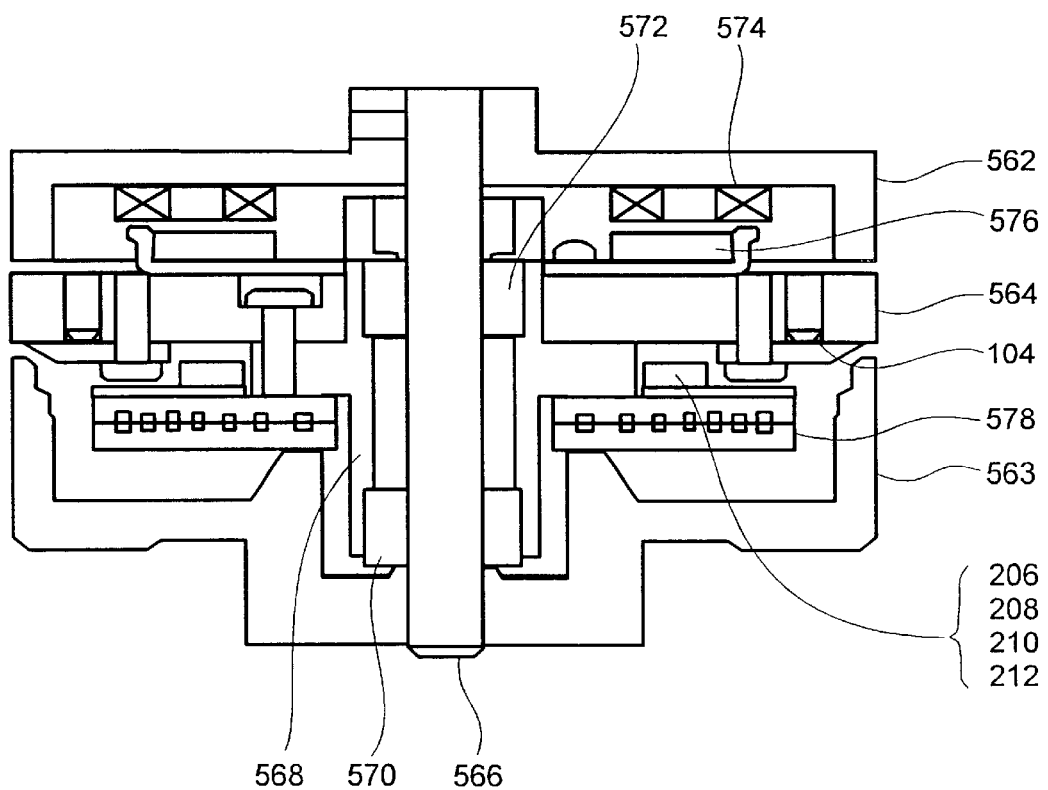
FIG. 5C illustrates a representative rotating drum in another specific embodiment according to the present invention.

FIG. 5C illustrates a profile view of a rotating cylinder in a specific embodiment according to the present invention. FIG. 5C illustrates a cylinder comprising of a plurality of non-rotating cylinders 562 and 563 and one rotating cylinder 564. A fixed shaft 566 is inserted into a lower side of non-rotating cylinder 563 to provide rigidity. A rotating disk 568 has two ball bearings 570 and 572 that enable rotational movement around the fixed shaft 566. Rotating cylinder 564 is fixed to the rotating disk 568 using some screws, for example (one is shown in FIG. 5C). Upper side non-rotating cylinder 562 houses a motor coil 574 inside and is fixedly attached to the fixed shaft 566 by a side screw, for example. Rotating cylinder 564 has heads on head base, including a magneto-resistive head 104, for example, on lower surface, and a motor magnet 576 on upper surface. A signal transformer 578, i.e., a rotary transformer, is fixed between non-rotating cylinder 563 and the rotating disk 568. Specific embodiments can provide for relatively higher rotating speeds, good head-to-tape contact because of thinner air film between cylinder surface and tape, and the like. The cleaning roller 302 is positioned by the cleaning device positioning mechanism of FIG. 5A in order to make contact with at least rotating cylinder 564, and, in specific embodiments one or more of the first non-rotating cylinder 562 and the second non-rotating cylinder 563. Further, embodiments include a plurality of signal lines and connectors between the head and the rotary transformer and between the stationary transformer and the outside circuit board (not shown in FIGS. 5B and 5C).

FIG. 6 illustrates a diagram of representative operation of a cleaning device in a specific embodiment according to the present invention. FIG. 6 illustrates a horizontal axis corresponding to Time, and a vertical axis, corresponding to Operating Condition during operation of a specific embodiment according to the present invention. Specifically, a drum rotational speed, a cleaning operation, an error rate, and a thermal noise signal are illustrated for a plurality of phases of operation of tape drive 10.

At a point A, a tape cartridge is inserted into the tape drive 10. The signal levels at this point indicate nominal values.

At a point B, an initial current is applied to the rotary head drive motor 316 during step 402. The drum rotational speed at point B increases substantially linearly to a substantially constant rotational speed. FIG. 6 illustrates the drum rotating.

At a point C, a cleaning operation is performed. FIG. 6 illustrates a cleaning roller 302 contacting the rotating drum to perform cleaning. The cleaning graph indicates that a cleaning operation is occurring.

At a point D, cleaning operation has finished. FIG. 6 illustrates that the cleaning roller is positioned away from the rotating drum. The cleaning graph indicates that the cleaning operation has ceased.

At a point E, a tape is loaded from the cartridge onto the cylinder and verify/read operation commences. Data verify/read begins at this point. Over time, an error rate increases due to some spacing issues between head and tape. For example, debris from tape surface can accumulate around the head surface by scanning many times. As indicated by a point X on the error rate graph, the error rate can reach a threshold value, potentially due to the presence of contaminant on the magneto-resistive read head. This is sensed by action of read amplifier 206 and controller 210 in step 406. If an upper limit of error rate(X) is detected, then the operating system initiates a cleaning operation as shown in column F.

At a point F, a cleaning operation is performed. FIG. 6 again illustrates a cleaning roller 302 contacting the rotating cylinder to perform cleaning as in step 410. The cleaning graph indicates that a cleaning operation is occurring. Drum rotational speed graph illustrates a reduction in drum rotational speed performed in step 422, for example. Error rate graph indicates that the error rate begins to decrease as the cleaning operation continues.

At a point G, the cleaning time for this system has elapsed, as determined in step 418. In a specific embodiment, a constant cleaning time (T0) can be used. Cleaning is discontinued, as indicated by the cleaning graph. FIG. 6 illustrates that the cleaning roller is positioned away from the rotating drum in step 414.

Alternatively, if during this cleaning operation thermal noise occurs, as detected in step 412, for example, the operating system 312 stops the cleaning operation by removing the cleaning roller 302 from contact with the cylinder 105 in order to restrict excessive rubbing. In general, if much debris exists on head surface, thermal noise can be generated by abrasive rubbing condition. If thermal noise buildup is detected in step 412, as illustrated by thermal noise graph in FIG. 6, the cleaning roller could be positioned away from the drum in order to avoid damaging the magneto-resistive head.

Figure 7A:
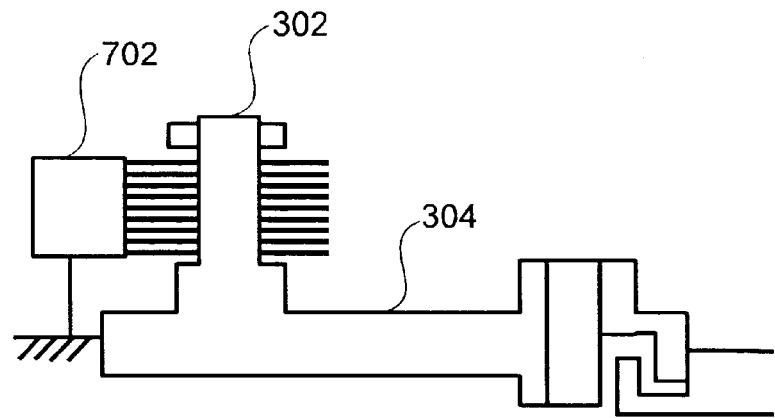
FIG. 7A illustrates a representative static conducting device in specific embodiments according to the present invention.

FIG. 7A illustrates a representative static conducting device in a specific embodiment according to the present invention. In the embodiment of FIG. 7A, a cleaning device for a rotary magneto-resistive head comprises a conductive element 702 positioned to contact the cleaning roller 302 when the cleaning roller is not in contact with the magneto-resistive head 104. The conductive element 702 acts to ground any static charge build up on the cleaning roller to the chassis of the tape drive 100.

Figure 7B:
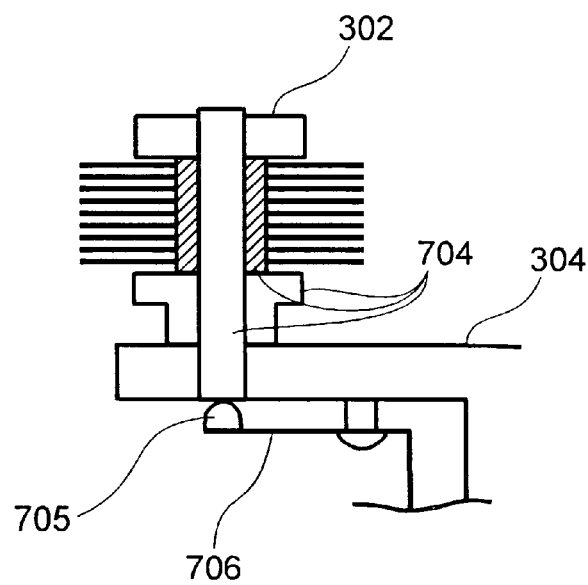
FIG. 7B illustrates another representative static conducting device in specific embodiments according to the present invention.

FIG. 7B illustrates another representative static conducting device in a rotary magneto-resistive head cleaning mechanism and control system in a specific embodiment according to the present invention. In the embodiment of FIG. 7B, a cleaning device for a rotary magneto-resistive head comprises a conductive element 704 positioned to contact the cleaning roller 302 at all times. Conductive element 704 is connected by a conductor to a carbon brush 705 that contacts a leaf spring 706 to a chassis of tape unit 100 to provide grounding.

The preceding has been a description of the preferred embodiment of the invention. It will be appreciated that deviations and modifications can be made without departing from the scope of the invention, which is defined by the appended claims.

What is claimed is:

1. An apparatus for cleaning a rotary magneto-resistive head, said apparatus comprising:
    a cleaning roller;
    an actuator arm, supporting said cleaning roller, to position said cleaning roller in and out of contact with at least said rotary magneto-resistive head;
    a cam, coupled with said actuator arm to provide a linear motion for said cleaning roller;
    a mode motor, coupled to said cam to provide motion;
    a read amplifier electrically coupled with said magneto-resistive head to sense a presence of thermal noise in an output of said magneto-resistive head;
    an error detector, electrically coupled with said read amplifier to sense an error rate;
    a control device, coupled to said error detector, said read amplifier and said mode motor;
    wherein said control device controls a position of said cleaning roller in contact with said rotary magneto-resistive head by action of said actuator arm and said cam and under power of said mode motor.

2. The apparatus for cleaning a rotary magneto-resistive head of claim 1, wherein:
    said control device further controls a force of said cleaning roller in contact with said rotary magneto-resistive head by action of said actuator arm and said cam and under power of said mode motor.

3. The apparatus for cleaning a rotary magneto-resistive head of claim 1, wherein:
    responsive to said error detector determining an error rate, said control device positions said cleaning roller in contact with said rotary magneto-resistive head by action of said actuator arm and said cam and under power of said mode motor.

4. The apparatus for cleaning a rotary magneto-resistive head of claim 3, wherein said determining an error rate further comprises:
    determining that an error rate is in excess of a threshold.

5. The apparatus for cleaning a rotary magneto-resistive head of claim 1, wherein:
    responsive to said read amplifier determining a presence of thermal noise, said control device positions said cleaning roller out of contact with said rotary magneto-resistive head by action of said actuator arm and said cam and under power of said mode motor.

6. The apparatus for cleaning a rotary magneto-resistive head of claim 5, wherein said determining a presence of thermal noise further comprises:
    determining that a thermal noise is in excess of a threshold.

7. The apparatus of claim 1 further comprising:
    a motor driver speed control, coupled to said control device, to control a rotational speed of said rotary magneto-resistive head, said control device operative to reduce said rotational speed of said rotary magneto-resistive head responsive to said read amplifier determining a presence of thermal noise in excess of a threshold.

8. The apparatus of claim 1, wherein said rotary magneto-resistive head is disposed on a rotating cylinder, said apparatus further comprising:
    a non-rotating cylinder positioned vertically beneath said rotating cylinder, said cleaning roller disposed to contact said rotating cylinder and said non-rotating cylinder.

9. The apparatus of claim 1, wherein said rotary magneto-resistive head is disposed on a rotating cylinder, said apparatus further comprising:
    a first non-rotating cylinder positioned vertically above said rotating cylinder and a second non-rotating cylinder positioned beneath said rotating cylinder, said cleaning roller disposed to contact at least any two of said rotating cylinder, said first non-rotating cylinder and said second non-rotating cylinder.

10. The apparatus of claim 1, wherein said rotary magneto-resistive head is disposed on a rotating cylinder, said apparatus further comprising:
    at least one of a plurality of additional rotary magneto-resistive heads.

11. The apparatus of claim 1, wherein said read amplifier senses a voltage to provide indication of said thermal noise.

12. The apparatus of claim 1, further comprising:
    a selectable verify/read mode of operation for said rotary magneto-resistive head.

13. An apparatus for cleaning a rotary magneto-resistive head, said apparatus comprising a cleaning device for a rotary magneto-resistive head, said cleaning device comprising a cleaning roller, positioned to contact said rotary magneto-resistive head, said apparatus further comprising a conductive element enabled to remove static charge from said cleaning roller.

14. An apparatus for cleaning a rotary magneto-resistive head, said apparatus comprising a cleaning device for a rotary magneto-resistive head, said cleaning device comprising a cleaning roller, positioned to contact said rotary magneto-resistive head, said apparatus having a conductive element positioned to contact said cleaning roller when said cleaning roller is not in contact with said magneto-resistive head.

15. An apparatus for reproducing information stored on a magnetic tape, said apparatus comprising a housing to receive a magnetic tape cartridge, a drive mechanism to move said magnetic tape from a first reel to a second reel within said magnetic tape cartridge, and a cleaning device for a rotary magneto-resistive head, said cleaning device comprising a cleaning roller, positioned to contact said rotary magneto-resistive head, said cleaning roller having a conductive element positioned to contact said cleaning roller when said cleaning roller is not in contact with said magneto-resistive head.

16. An apparatus for cleaning a rotary magneto-resistive head, said apparatus comprising a cleaning device for a rotary magneto-resistive head, said cleaning device comprising a cleaning roller, positioned to contact said rotary magneto-resistive head, said cleaning roller having a conductive element positioned to contact said cleaning roller and connected through a carbon brush and leaf spring to a ground.

17. An apparatus for reproducing information stored on a magnetic tape, said apparatus comprising a housing to receive a magnetic tape cartridge, a drive mechanism to move said magnetic tape from a first reel to a second reel within said magnetic tape cartridge, and a cleaning device for a rotary magneto-resistive head, said cleaning device comprising a cleaning roller, positioned to contact said rotary magneto-resistive head, said cleaning roller having a conductive element positioned to contact said cleaning roller and connected through a carbon brush and leaf spring to a ground.

18. An apparatus for cleaning a rotary magneto-resistive head, said apparatus comprising:

means for removing contaminant from said rotary magneto-resistive head;

means for positioning said means for removing contaminant in contact with said rotary magneto-resistive head; and means for removing static electric charge from said means for removing contaminant.

\* \* \* \* \*